March 8, 1927. 1,620,255
J. A. HALL
TUBULAR STONE SAW
Filed July 11, 1925
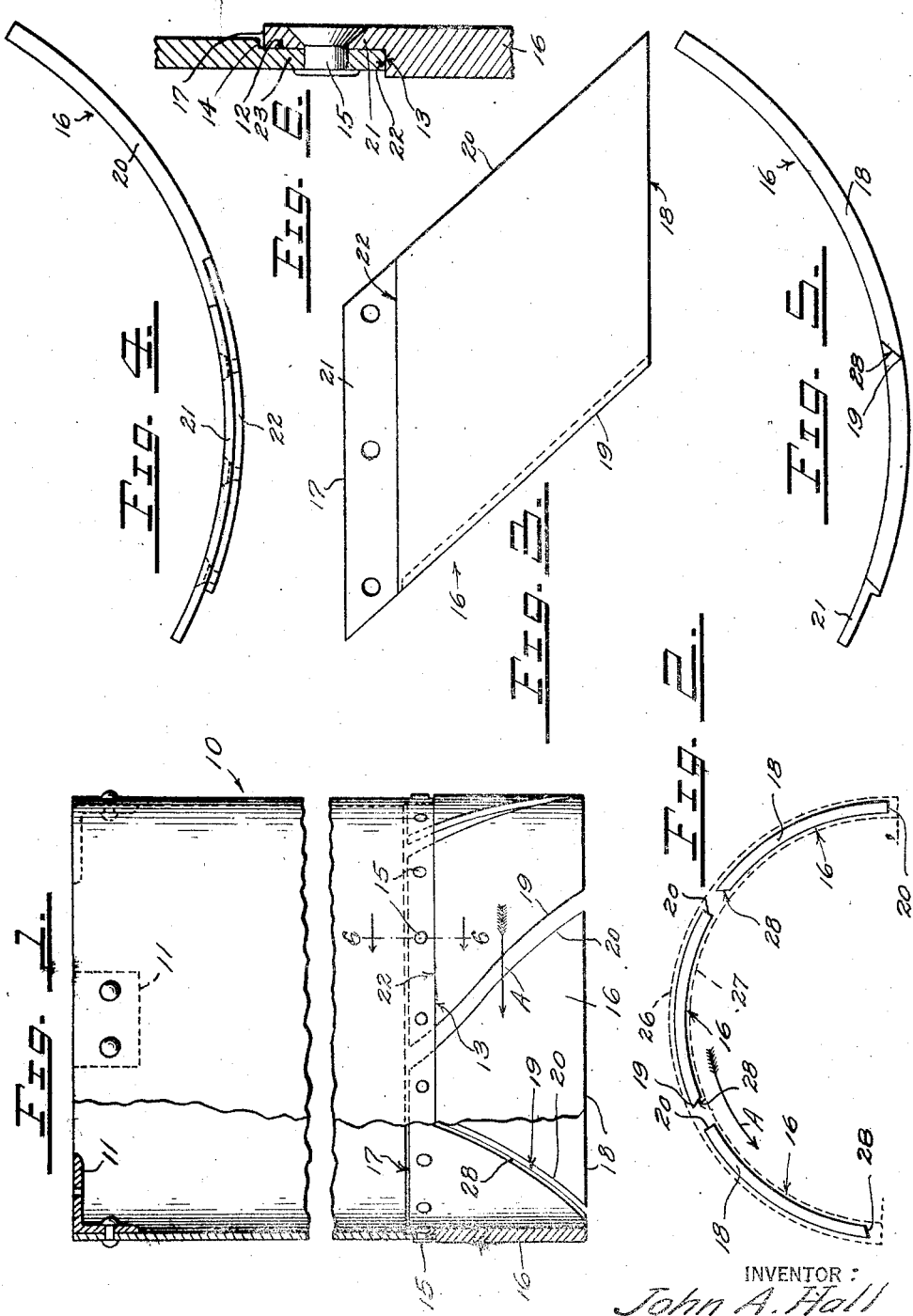
INVENTOR:
John A. Hall
BY
Pierre Barnes
ATTORNEY Patented Mar. 8, 1927.

1,620,255

UNITED STATES PATENT OFFICE.

JOHN A. HALL, OF SEATTLE, WASHINGTON.

TUBULAR STONE SAW.

Application filed July 11, 1925. Serial No. 42,921.

This invention relates to tubular saws having removable teeth such as shown, for example, in the stone sawing machine forming the subject matter of patent application Serial No. 40,159, filed by myself and Wallace L. Newell, June 29, 1925.

The object of my invention is the provision of a durable, strong and efficient saw of this character, for use with an abrasive material such as fine metallic shot, in sawing or cutting an annular kerf in granite or other stone in the production of a cylindrical block therefrom.

More specific objects and advantages of the invention will appear in the following description.

The invention consists in the novel construction, adaptation, and combination of parts hereinafter described and claimed.

In the accompanying drawing,—

Figure 1 is a view partly in elevation and partly in vertical section of a tubular saw embodying my invention. Fig. 2 is an underside diagrammatic view of a portion of Fig. 1, to illustrate the arrangement of the saw teeth with respect to each other. Fig. 3 is a front elevation of one of the saw teeth developed. Figs. 4 and 5 are top and underside plan views, respectively, of Fig. 3. Fig. 6 is a detail sectional view on line 6—6 of Fig. 1 showing the connection between the saw body and a tooth.

In said drawing, the reference numeral 10 represents a tubular shell constituting the saw body. Said body has secured rigidly to its upper end angle pieces 11 to receive bolts or rivets for securing the body to a disk or the like which is mounted upon an end of a saw arbor.

The arbor and the disk above referred to are not shown in the drawing.

Said body is rotative about its longitudinal axis in the direction indicated by arrow A in Figs. 1 and 2.

The body 10 is provided interiorly about its lower end with a recess or rabbet formed by a cylindrical surface 12 extending from the lower edge 13 of the body to a peripheral shoulder 14.

Secured, as by means of rivets 15, to the bottom of the body 10 is a plurality of teeth 16 disposed circumferentially of the body. Each of said teeth is of a substantially tetragonal shape in side elevation and of an arcuate shape in horizontal section, the curvature of which is concentric with the axis of the tooth's revolution. More particularly, a tooth is formed with an upper edge 17 and a lower edge 18 parallel with each other, and a front edge 19 and a rear edge 20 which are also in substantially parallelism with each other. Said front and rear edges of a tooth are, moreover, inclined rearwardly, from the top downwardly, at an angle of approximately forty five degrees with respect to the planes of the top and bottom edges of the tooth. The tooth is of greater thickness than the thickness of the peripheral wall of the tubular body.

A tooth is provided at its upper end with a tongue 21 afforded by a recess or rabbet formed in the outer or convex side of the tooth, said tongue extending from a shoulder 22 at the bottom of said rabbet.

The length of the tongue 21 is, however, less than the depth of the body surface 12 to enable the bottom edge 13 to serve as a bearing for the tooth shoulder 22 and have the upper edge 17 of the tooth out of contact with the body's shoulder 14.

The overlying tongue portions 23 and 21 of the shell and tooth, respectively, are bored to receive coupling rivets 15, two or more for each tooth. The extreme length of a rivet is desirably less than the maximum thickness of the tooth radially of its center of revolution.

The cutting of a stone is performed through the agency of abrasive shot which is fed with water into the annular kerf indicated by the space between dotted lines 26, 27 in Fig. 2.

In use, the shot is revolubly carried with the teeth and, subject to centrifugal force, tends to accumulate against the outer periphery 26 of the kerf. To overcome such outward movement of the shot and effect a distribution of the shot throughout the bottom of the kerf, the front edges 19 of the teeth are beveled horizontally to provide faces 28 which serve to urge the shot centripetally during the revoluble travel of the same in the kerf.

To ensure uniformity in the curvature of the teeth, circumferentially of the saw, the teeth are advantageously cut from a metal plate, as by means of an acetylene torch, after the plate has been bent or rolled into a ring having a diameter to suit the shell.

What I claim, is,—

1. A tooth for a tubular stone-saw, said tooth having parallel upper and lower edges and substantially parallel front and rear edges disposed obliquely with respect to the first named edges, said tooth being curved horizontally to the curvature of the saw's circumference and having a rabbet in the upper portion of its convex side to provide a bearing shoulder and a tongue at the concave side of the tooth and protruding above the plane of said shoulder.

2. A stone-saw tooth as defined in claim 1, wherein the oblique front edge of the tooth is beveled with respect to its inner and outer sides for the purpose of directing abrasive material from the outer to the inner periphery of the saw kerf.

3. In a stone-saw, a tubular body having at its lower end a circumferentially disposed recess, and a plurality of teeth extending into said recess, said teeth being curved circumferentially of the saw, each of the teeth being provided with a shoulder adapted to bear against the lower end of said body.

4. In a stone saw, as defined in claim 4, wherein the recess of the saw body is positioned interiorly thereof, and the teeth are recessed on their convex sides to afford tongues to extend into the body recess, and tooth securing means extending radially of the saw through the respective teeth tongues and the saw body.

Signed at Montpelier, Vermont, this 9th day of July 1925.

JOHN A. HALL.